July 9, 1968　　　　　F. DUERST　　　　3,391,906
HOISTING APPARATUS WITH A SWINGABLE BOOM AND TACKLE, IN
PARTICULAR FOR THE BUILDING INDUSTRY
Filed Aug. 21, 1967　　　　　　　　　8 Sheets-Sheet 1

INVENTOR:

FELIX DUERST by Jacob L. Kollin,
ATTORNEY

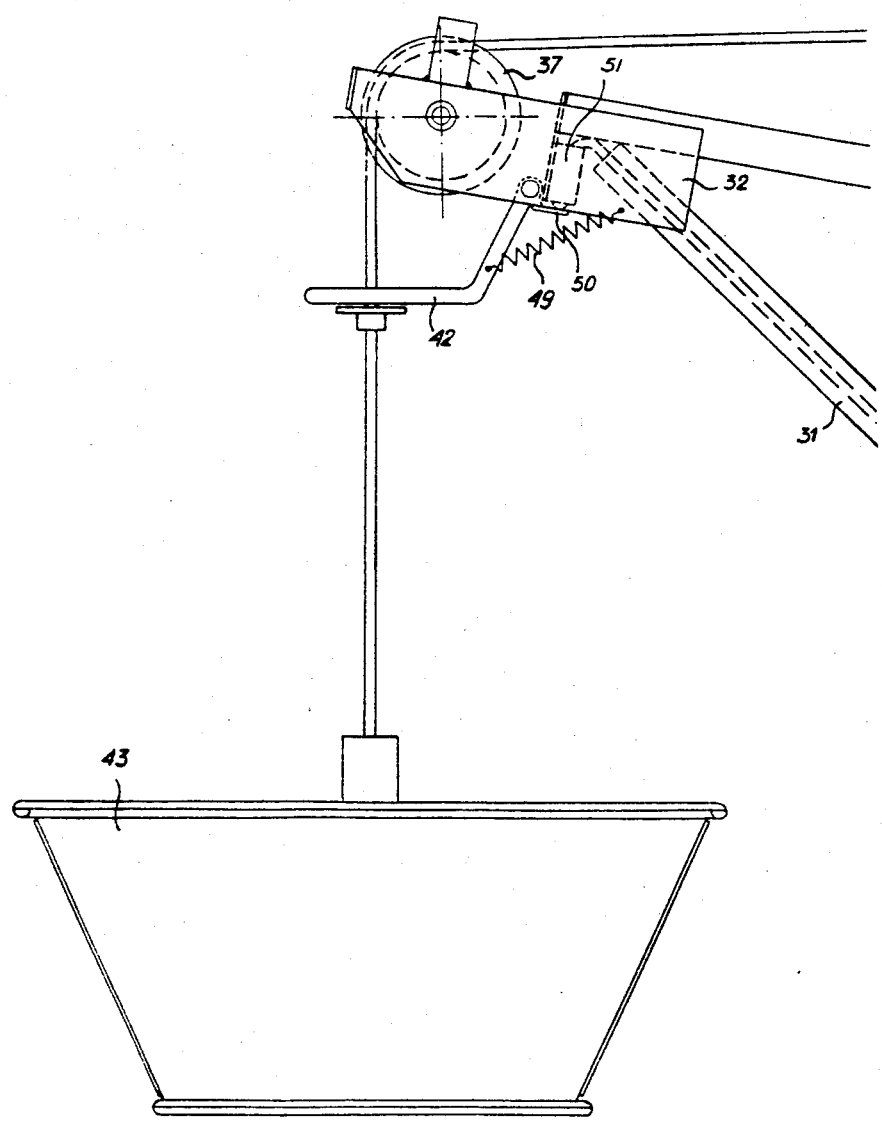

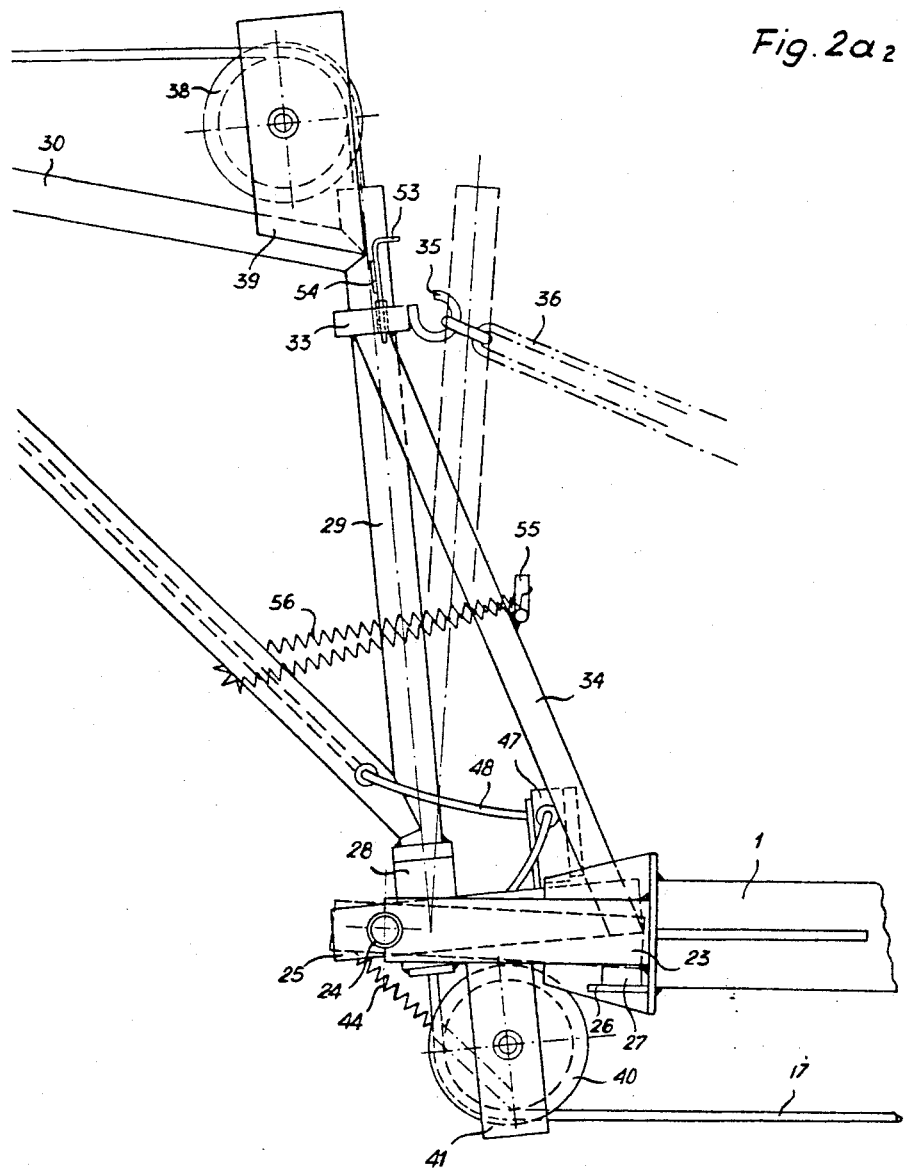
Fig. 2a₂

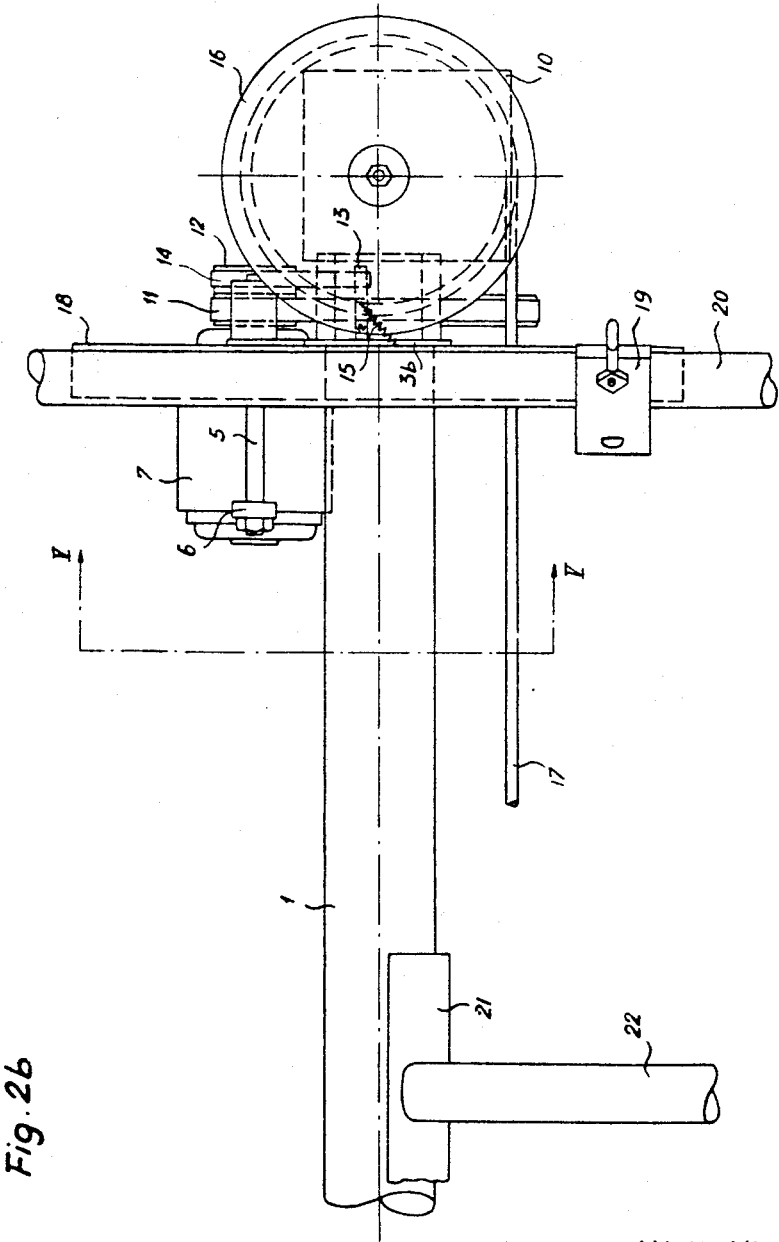

July 9, 1968 F. DUERST 3,391,906
HOISTING APPARATUS WITH A SWINGABLE BOOM AND TACKLE, IN
PARTICULAR FOR THE BUILDING INDUSTRY
Filed Aug. 21, 1967 8 Sheets-Sheet 5

INVENTOR:
FELIX DUERST
by Jacob L. Kollin,
ATTORNEY

Fig. 4a₁
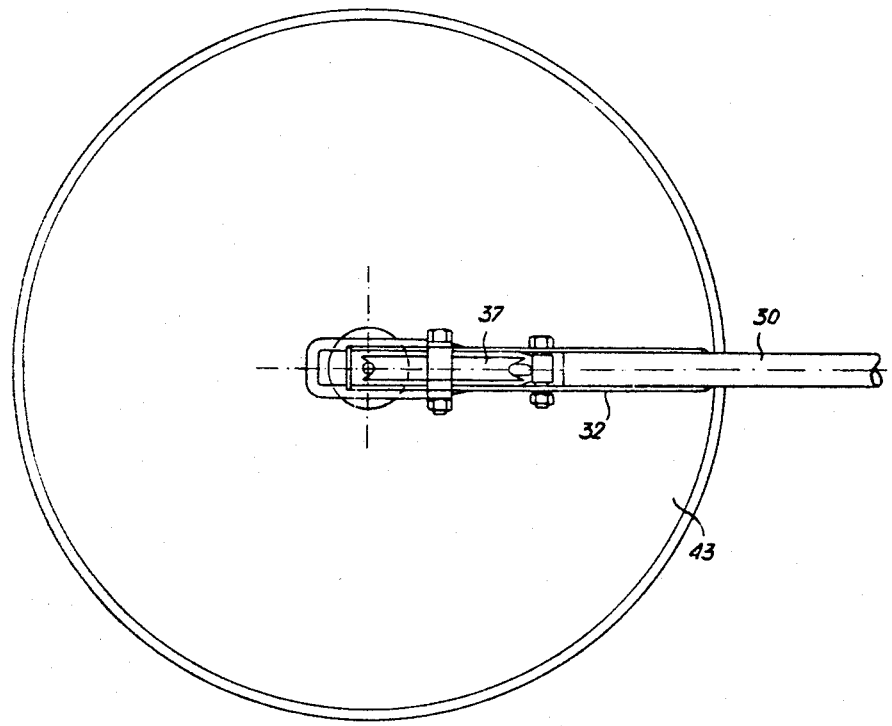
INVENTOR:
FELIX DUERST
by Jacob L. Kollin
ATTORNEY

July 9, 1968     F. DUERST     3,391,906
HOISTING APPARATUS WITH A SWINGABLE BOOM AND TACKLE, IN
PARTICULAR FOR THE BUILDING INDUSTRY
Filed Aug. 21, 1967     8 Sheets-Sheet 7
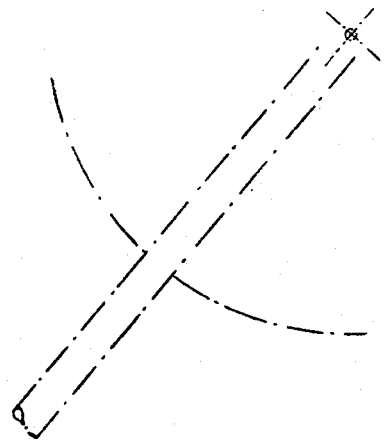
Fig. 4a2
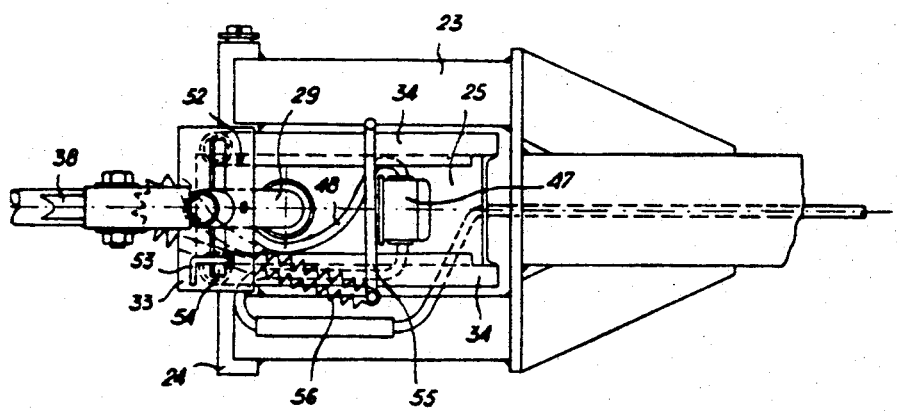
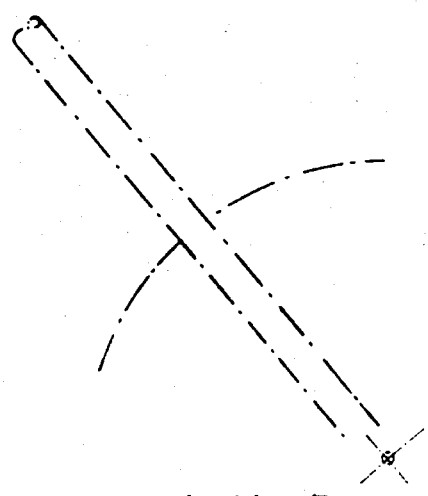
INVENTOR: FELIX DUERST
by Jacob L. Kollin, ATTORNEY

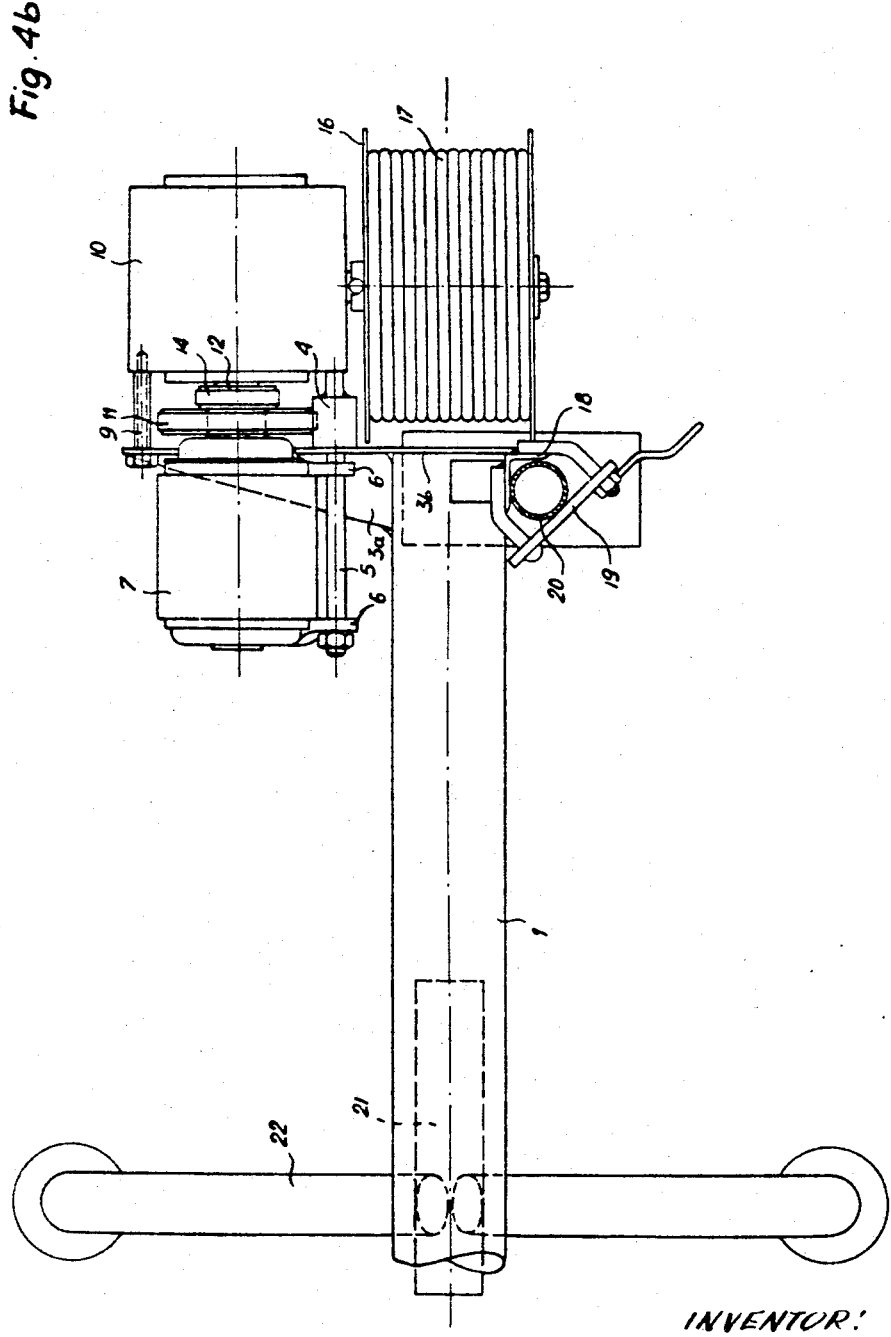

United States Patent Office 3,391,906
Patented July 9, 1968

3,391,906
HOISTING APPARATUS WITH A SWINGABLE BOOM AND TACKLE, IN PARTICULAR FOR THE BUILDING INDUSTRY
Felix Duerst, Zurich, Switzerland, assignor to Firma Isokorkwerk, Oberwemingen-Schoefflisdorf, Zurich, Switzerland
Substituted for abandoned application Ser. No. 388,143, Aug. 7, 1964. This application Aug. 21, 1967, Ser. No. 670,845
6 Claims. (Cl. 254—142)

ABSTRACT OF THE DISCLOSURE

Hoisting apparatus having a horizontal load arm, detachably secured to a support. A cable drum is detachably secured to one end of the load arm. A horizontal hinge axle is secured at the other end of the load arm. A balance is mounted on the axle. The lower end of a swingable boom is mounted on the other end of the load arm while the upper end of the swingable axle is reinforced by a tension member at the load arm.

Background of the invention

Figure 1:
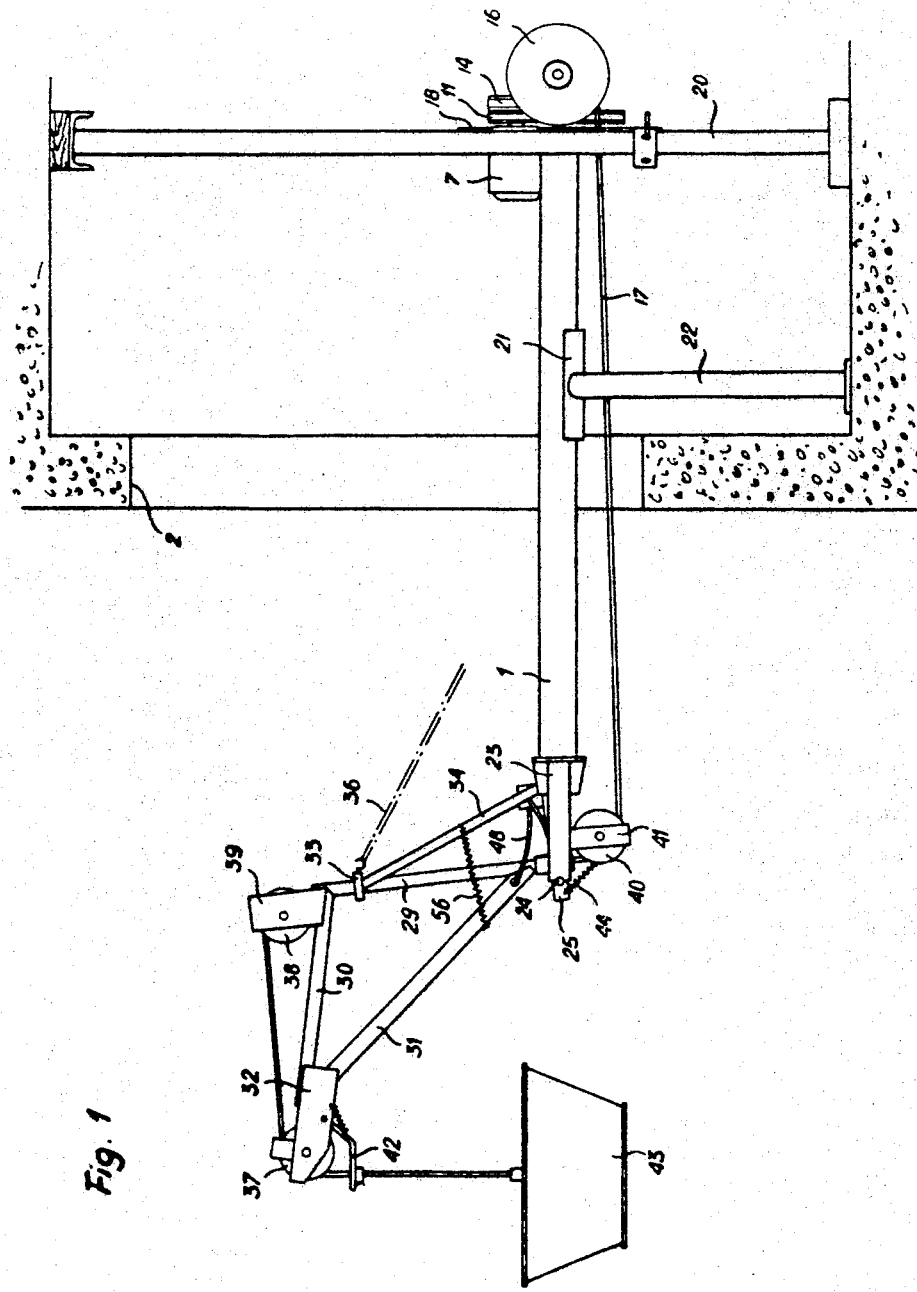

The invention relates to a hoisting apparatus with a swingable boom and tackle, as employed in the building industry and which is used to transport materials such as boards, beams, concrete, refuse and the like in cable rope slings or in buckets from the upper stories of a building to the ground or vice-versa. Known lifting devices of this type must be supported mainly outside a building, e.g. at the building's frame. This is not only unsatisfactory, but requires special load bearing frames. At the same time it is practically impossible to construct the cable rope drum or the motor drive required therefor as a fixed component part of the lifting device; the cable rope drum must be mounted either on the ground or within the building and supported at a desired lifting level. The mounting of the cable rope drum on the ground is not only unsatisfactory but is also dangerous, because the service personnel must remain directly under the working area of the swingable boom. Additionally, however, the mounting of the cable rope drum within the building requires a special reinforcement, thus making the mounting more difficult. The known lifting devices possess an additional disadvantage in that their swingable booms are unstable in all of their swung positions and thus require a satisfactory supervision in order that unforeseen swingings of the swingable boom should not lead to accidents.

The object of the present invention is to provide a lifting device with a swingable boom and cable rope or tackle which will obviate the above mentioned disadvantages of known constructions. To this end the lifting device according to the invention consists of at least one substantially horizontal load arm which is detachably secured to a support, a cable rope drum detachably secured at one end of the load arm, a horizontal hinge axle secured at the other end of the load arm, a balance mounted on said axle, the lower end of the swinging axle of the swingable boom being mounted on said other end, while the upper end portion of the swingable axle is reinforced by means of a tension member at the load arm.

The nearly horizontal load arm may be guided to the desired lifting height through a wall opening e.g. through a window of a building, so that the cable rope drum and, when possible, its drive motor may be placed inside the building and the support of the load arm can likewise be anchored within the former, while the swingable boom may be disposed entirely outside the wall of the building; a scaffold frame for supporting this swingable boom is not necessary. The load arm may be constructed as a two-part telescoping type and accordingly may be adjustable in length.

Depending on the positioning of the swinging axis of the swingable boom on a counter-balance, the load which is suspended from the downwardly directed cable end will be stable in the normal position when the swinging axis of the swingable boom is positioned in the vertical plane of the axis of the load arm as well as in the maximum possible swung position of the swingable boom relative to this normal position. Only after overcoming a dead center position during the tilting of the balance from the first into a second tilted position takes place, can the load be moved from one of the stable position into another. It can thus be assured that the swingable boom and therewith the load suspended therefrom will not swing out of any given stable position independently. Additional means are provided which guide back automatically the swingable boom after it has swung out of its normal position.

An example of an embodiment of the invention is shown in the accompanying drawing of the lifting device according to the invention.

Figure 3:
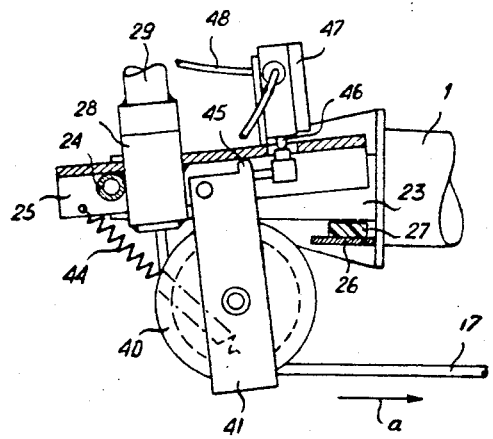
Figure 5:
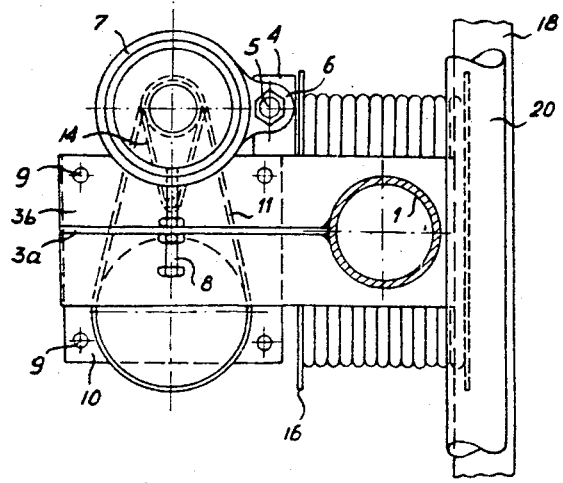

In the drawing:
FIG. 1 is a side view of the lifting device,
FIG. 2a1 is an enlarged detail of the device of FIG. 1,
FIG. 2a2 is another enlarged detail of the device of FIG. 1,
FIG. 2b is a side view of the supporting part with the drive unit of the lifting device,
FIG. 3 is a vertical section of a detail according to FIG. 2a,
FIG. 4a1 is an enlarged detail, in plan view, of the device of FIG. 1,
FIG. 4a2 is an enlarged detail, in plan view, of the device shown in FIG. 2a2,
FIG. 4b is a plan view of the part shown in FIG. 2b and
FIG. 5 is a cross-section taken on line V—V of FIG. 2b.

The lifting device comprises a horizontally mounted load arm 1 which is constructed as a two-part telescoping pipe and protrudes from a window opening of the building frame.

At the rear end portion of the load arm 1, which is disposed in the building structure there are provided angular struts 3a, 3b; a supporting bearing 4 is secured to the vertical flanges 3a of these angular struts. An axle 5 is mounted in the supporting bearing 4 and on this axle there are mounted two supporting eyes 6 of an electromotor 7. This motor, swingably supported on the axle 5, is braced adjustably on a brace bolt 8 which is mounted on the vertical flange 3a of the angular struts, as shown in FIG. 5. A drive housing 10 is further secured to the vertical flange 5b by means of tension bolts 9 and an independent worm gear drive is mounted in this housing.

The drive shaft of electromotor 7 is connected with the input shaft of the drive by means of a drive belt 11. A brake wheel 12, which is connected through a free wheeling device with the motor shaft, is mounted on the motor shaft. A brake band 14 is positioned over the brake wheel 12 about the flange 3b. The brake band is connected to a tension lever 13, which is under the tension of a spring 15.

The illustrated construction of the belt drive between the motor and the drive mechanism is particularly advantageous, because the belt is practically shielded and thus does not constitute a source of danger for the personnel. A cable drum 16 is coupled with the drive axle of the drive and this drum may be removed when disassembling the lifting device. The hoisting cable 17 may be wound on this drum.

A bearing angle 18 is secured to the vertical flange of the strut. A support pipe 20 is detachably mounted on this bearing angle by means of clamps 19. A limit support angle 21 positioned against load arm 1 may be detachably secured to the load arm 1 by means of clamps (not shown).

A support jack consisting of a pair of downwardly diverging support pipes 22 is secured to the limit support angle 21. This support jack with the limit support angle 21 may be set in a desired position under the load arm 1.

A U-shaped frame 23 is secured with its base to the end portion of the load arm 1 extending through the window opening 2. The legs of frame 23 support a transverse axle 24 in a horizontal plane. A balance 25 is mounted on the axle between the frame legs. The frame 23 is provided in its base region with a base piece 26 on which is secured a buffer 27 of elastic rubber for the counterbalance extending directly in front of the base of the frame 25. A supporting bearing 28 is secured between the end of the balance 25 turned towards the base of the frame and the transverse axle 24 in this balance 25, in which the lower end of the tubular shaped swinging axle 29 of the boom is mounted.

This boom is provided with upper and lower struts 30, 31, secured at the ends of the swinging axle 29, the other ends of the said struts being connected by means of a plate yoke 32. The upper part of the swinging axle of the boom 29 is held in a collar 33 which is supported, by means of struts 34, at the inturned end part of the base of the frame 23 of the counterbalance. A hook 35 is further provided in collar 33 on which is suspended one end of a chain 36 (FIG. 2a2). The other end of the chain is adjustable relative to a hool (not shown) at the load arm 1. A cable sheave 37 is mounted in the forward part of the plate yoke of the boom which extends over the struts 30, 31; a further cable sheave 38 is mounted in a plate yoke 39 secured in the upper boom part 29, while a third cable sheave 40 is mounted on a plate yoke 41 extending downwardly from the balance 25. The cable 17 which arrives from the cable drum 16 is guided through the tubular swinging axle 29 of the boom through and over the cable sheaves 38 and 37 whence it is freely suspended downwardly through a guide yoke 42 downwardly.

A modification of the hoisting device may be carried out by dispensing with the upper strut 30. For this purpose, the strut 31 is swingably mounted on a horizontal bolt and the swinging axle 29, and cable 17 is looped over the cable sheave 37. This is advantageous because the cable sheave 37 and thereby the loading bucket suspended from cable 17 may be brought close to the swinging axis, whereby the swinging circle of the suspended load will become smaller.

The described hoisting device is provided with means for automatically stopping of the cable drive. As particularly shown in FIG. 3, the plate yoke 41 is mounted at an upper angle point on the balance 25, whereby its own weight as well as a spring 44 of the yoke 41 tend to swing against the cable's pull indicated by arrow a. Furthermore, a nose 45 at the plate yoke 41 restricts the swinging of the latter under the influence of the cable's pull against the tensioning effect of the spring 44 by means of a striker at the upper part of the H-shaped balance 25. In addition the complete yoke 41 carries a switch finger 46, which protrudes upwardly through an aperture in the balance bar and cooperates with a switch 47, which is mounted on the counterbalance and which is connected by means of an electric cable 48 in the circuit of the drive motor 7.

As long as the bucket 43 or any other load secured to cable 17 hangs free on this cable, the pull of the cable has the effect of closing the switch finger 46 of the switch 47; as soon, however, as the load reaches the ground or any other support so that the cable is released the spring 44 of the yoke 41 moves the switch finger 46 thereof out of contact with the switch 47 so that motor 7 is stopped. Similar security means are provided in the plate yoke 32. A two-armed angular member 42 is linked with yoke 32 and the cable 17 is guided through the guide opening of the latter. A spring 49 tends to pull the striker element 42 downwardly, so that a switch finger 50 of this angular member maintains closed a switch 51, connected to the cable 48, in closed position.

Should the bucket 43 or the load suspended on cable 17 be lifted so high that it impinges against the yoke 42, then this latter will swing upwardly against the action of the spring 49 whereby the switch finger 50 of the switch 51 will be lifted, thus automatically disconnecting the motor drive.

Two or more lugs 52 are provided in collar 33 for inserting pins 53, in order to secure the axle in a desired swinging position. Lateral stop vanes cooperating with said pins are secured to the swinging axle. Furthermore, a transverse rod 55 with upwardly angled end portions is secured to the struts 34 of the boom. A spring 56 may be hung on these end portions and this spring may be looped about the strut 31 and will thus hold the boom in a swung position determined by vane 54 and pins 53.

The above described hoisting device is used in the following manner; in order to fill the bucket 43, it is lowered to the ground so that the boom 29, 30, 31, assumes its normal position shown in FIGS. 1, 2a1, 4a, i.e. the swinging axle 29 of the boom lies in the vertical plane through the axis of the load arm 1; the chain 36 is adjusted according to its length in such a manner that the yoke 25 is swung from its horizontal position outwardly about a sharp angle of approximately 10 to 20° in an anti-clockwise direction, so that the swinging axle 29 which is disposed at a right angle to the counterbalance 25 is slightly inclined outwardly at an equally sharp angle to the vertical from load arm 1. The weight of the boom and the running cable 17 keep the boom stable in this normal position, the stability increasing during the final lifting or hoisting of the filled bucket. Additionally, the vane 54 is under the tensioning effect of the spring 56 against the insert pins 55 inserted in the respective holes 52. An undesirable oscillation or a full lateral swinging of the boom is thus obviated without difficulty. Should the bucket 43 have reached the desired lift height, in which the bucket is on the level of the window sill of the window opening 2, then the bucket 43 will be appropriately pulled in by means of a suitable hooked rod. On the other hand the booms 29, 30, 31, may also be swung outwardly from their normal position. It will be readily apparent that when the center of the bucket is swung outwardly over the extension of the cross axle 24, which is possible when the resistance of the spring 56 is overcome, the counterbalance 25 (FIG. 2a) will tilt in clockwise direction about the transverse axle 24, downwardly, until it bears on the striker 27 or the buffer thereon of elastic material. In this tilted position, shown in dotted lines in FIG. 2a, the boom is stable and can only swing back under the influence of spring 56. The installation is arranged in such a manner that in this side limit position of the boom's swinging shown in dotted lines in FIG. 4a, the counterbalance 25 is swung downwardly about an angle of 10 and 20° from the horizontal. From this limit swinging position of the boom the bucket 43 may be set down on the building frame or it may be fetched into the building through the window opening 2.

As mentioned above the drive is constructed as an automatically stopping worm gear drive. When larger loads are lifted, however, the danger is present that when the motor is stopped, the automatic brake action of the drive may be overcome by the free-hanging load. This is prevented by the brake wheel 12 equipped with free-wheeling and the belt 14. The device is constructed in such a manner, that the load, while being lifted, acts between the wheel 12 and the motor shaft of the free wheeling device when the cable 17 travels in an opposite direction, the wheel 12 is coupled with the motor shaft and is braked by means of the tensioned belt 14. As long as the drive is connected this slip friction will be overcome without difficulty when the drive is at a standstill. This friction suffices, however, to maintain the cable absolutely stationary by its self-braking.

From the above it will be apparent that the described hoisting device forms a relatively compact unit which may be mounted practically anywhere; a separate mounting of the cable drum and its drive motor is not necessary. The hoisting device may be easily transported. For this purpose the boom is swung to the limit of its lateral position and secured in such position, while the cable drum 16 is removed from the drive housing and may be secured to a suitable holding bolt at the frame 23 or at an adjacent load arm end, while the load arm 1 in one of the booms, the winch bearing part and the part bearing the motor and the drive may be disassembled. The dimensions of the hoisting device parts to be transported become relatively small. The extent of reach of the boom is considerably increased by the two-part load arm 1 and, as shown in FIG. 1, the load arm 1 while requiring a small amount of space, permits the bridging of relatively larger spaces between the boom and the support locations.

I claim:

1. Window crane, comprising, in combination, a crane support means, a horizontal load arm having an inner end and an outer end, said inner end being detachably secured to said support means, a U-shaped frame member secured with its base to the outer end of said load arm, an axle secured transversely to the legs of said U-shaped member, a balance swingably mounted on said axle, a supporting bearing secured to said balance, a tubular upwardly extending swinging axle mounted in said bearing, means for securing said swinging axle in a chosen position, an upper strut and a lower strut, each of said struts having one end secured to the upper and lower ends of said swinging axle, respectively, a first yoke securing the other ends of said struts to one another, a second yoke pivotally secured with its upper portion to said balance, a third yoke secured to said other end of the upper strut, each of said yoke having a sheave secured thereto, an electric power drive secured to said support means, a cable operable by said drive and extending through said sheaves and having a downwardly depending end for securing a load, first sensing means associated with said first yoke for cutting off power when the load is too high and second sensing means associated with said second yoke for cutting off power to said power drive when the load is on the ground.

2. Window crane according to claim 1, wherein said first sensing means comprises a switch secured to said first yoke, a two-arm angular member having one arm pivoted to said first yoke and provided with a switch finger cooperating with said switch, the other arm of said angular member having a guide opening for said cable, a spring for biasing said switch finger against said switch, one end of said spring being secured to said one arm, the other end of said spring being secured to said first yoke and means for connecting said switch to said electrical power drive.

3. Apparatus according to claim 1, wherein said second sensing means comprises an electrical switch mounted on said balance, said balance having an aperture therethrough, the upper portion of said second yoke being provided at its upper end with a switch finger adapted to extend through said aperture and cooperating with said switch and a spring for biasing said upper end of said second yoke and said striker element in a direction away from said switch, one end of said spring being secured to said balance, its other end being secured to the lower end of said yoke.

4. Window crane according to claim 3, wherein said upper portion of said second yoke is provided with an upwardly extending striker for restricting the swinging of said second yoke under the influence of the cable's pull against the tensioning effect of said spring.

5. Apparatus according to claim 4, wherein said U-shaped frame is provided with a base piece and an elastic buffer element for said balance secured to said base piece.

6. Window crane according to claim 5, wherein said means for securing the crane in a chosen position, comprises a collar for said swinging axle, struts for supporting said collar, a plurality of vanes, said collar having a plurality of holes therein, insert pins adapted for placement in said holes and cooperating with said vanes for holding said swinging axle.

References Cited

UNITED STATES PATENTS

| | | | |
|---|---|---|---|
| 1,658,873 | 2/1928 | Younkman | 212—8 |
| 1,720,714 | 7/1929 | Bergesen | 212—8 |
| 2,529,193 | 11/1950 | Reuter | 212—39 |
| 2,544,553 | 3/1951 | Eakin | 212—46 |
| 3,024,918 | 3/1962 | Cline | 212—8 |
| 3,094,221 | 6/1963 | Galuska | 212—39 |

FOREIGN PATENTS 1,308,202  12/1961  France.

EVON C. BLUNK, *Primary Examiner.*

H. C. HORNSBY, *Assistant Examiner.*